United States Patent [19]
Johnson

[11] 3,977,065
[45] Aug. 31, 1976

[54] CRIMPING MACHINE

[75] Inventor: John W. Johnson, Manhattan Beach, Calif.

[73] Assignee: Wyle Laboratories, El Segundo, Calif.

[22] Filed: Jan. 27, 1975

[21] Appl. No.: 544,185

Related U.S. Application Data

[63] Continuation-in-part of Ser. No. 352,174, March 1, 1973, Pat. No. 3,879,834.

[52] U.S. Cl. .................... 29/237; 29/252; 29/516; 72/402; 72/452; 279/4; 279/122
[51] Int. Cl.² .......................................... B23P 19/04
[58] Field of Search ................. 29/237, 243.5, 508, 29/516, 252; 72/402, 391, 452, 453, 445; 279/122, 4, 74; 81/304

[56] References Cited
UNITED STATES PATENTS

| | | | |
|---|---|---|---|
| 745,773 | 12/1903 | Borden | 279/122 |
| 2,430,761 | 11/1947 | Duphily | 279/74 |
| 2,768,830 | 10/1956 | Janson | 279/4 |
| 3,217,519 | 11/1965 | Demler | 81/304 X |
| 3,234,776 | 2/1966 | Stoltz | 72/452 X |
| 3,335,594 | 8/1967 | Peterman et al. | 29/508 X |
| 3,568,494 | 3/1971 | Geisman | 29/237 X |
| 3,603,132 | 9/1971 | Holmes | 72/453 X |
| 3,805,580 | 4/1974 | Leiker et al. | 29/237 X |

*Primary Examiner*—Charlie T. Moon
*Attorney, Agent, or Firm*—Lindenberg, Freilich, Wasserman, Rosen & Fernandez

[57] ABSTRACT

Apparatus for crimping a fitting onto a hose or the like, including a ram with a slideable piston for moving a set of crimping dies together, wherein the piston has a central passageway extending along its entire length so that a hose can extend through the back end of the machine.

2 Claims, 8 Drawing Figures

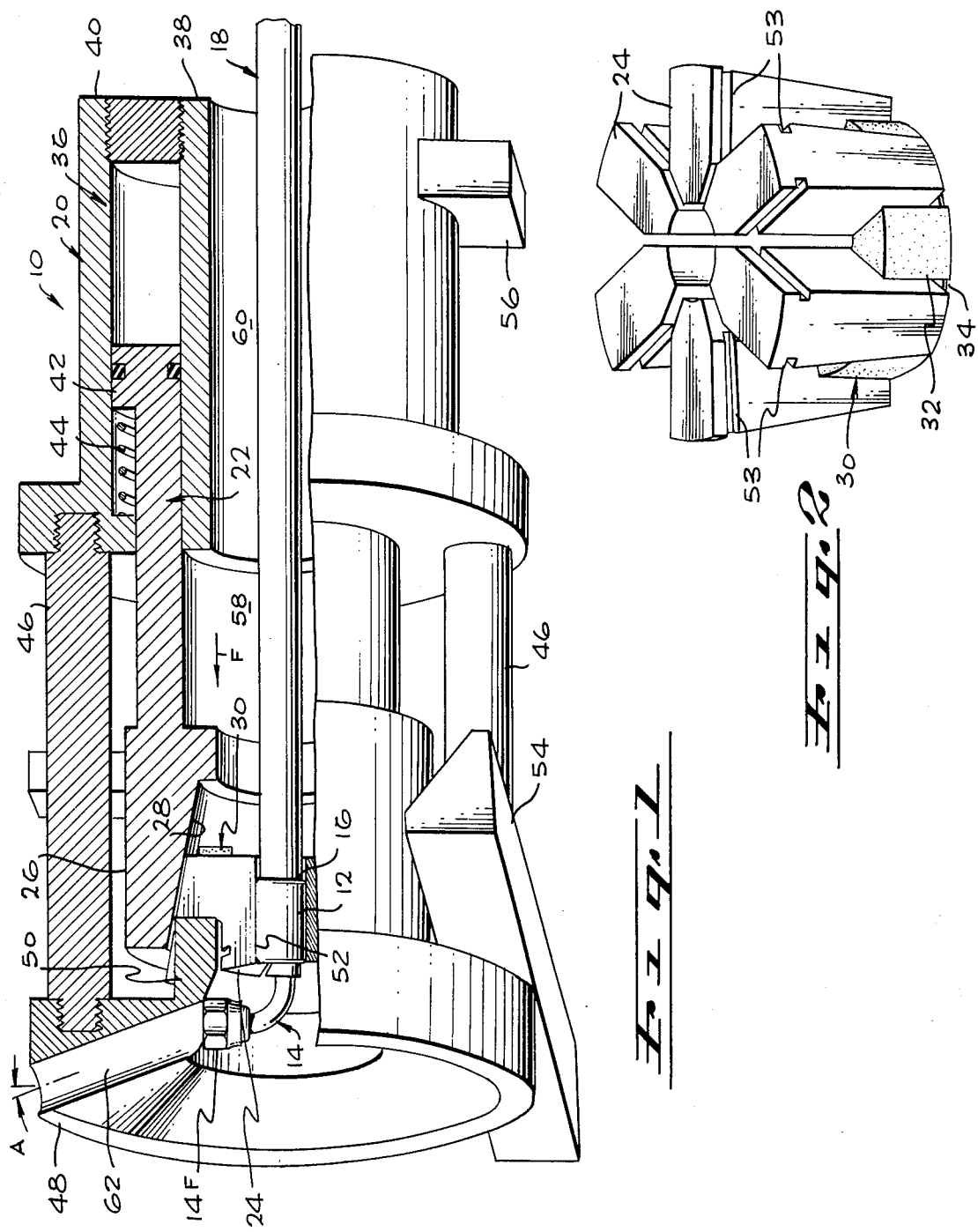

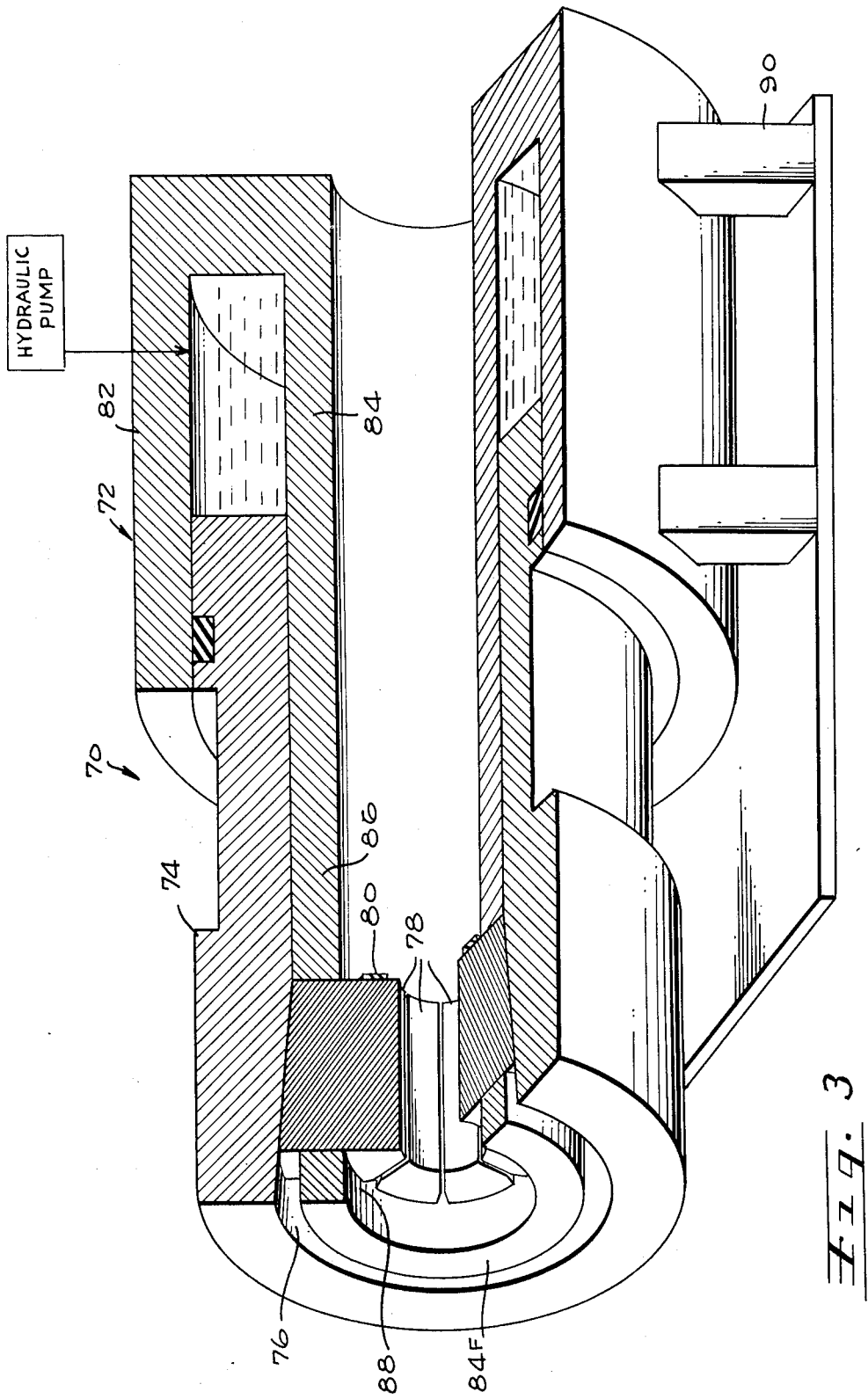

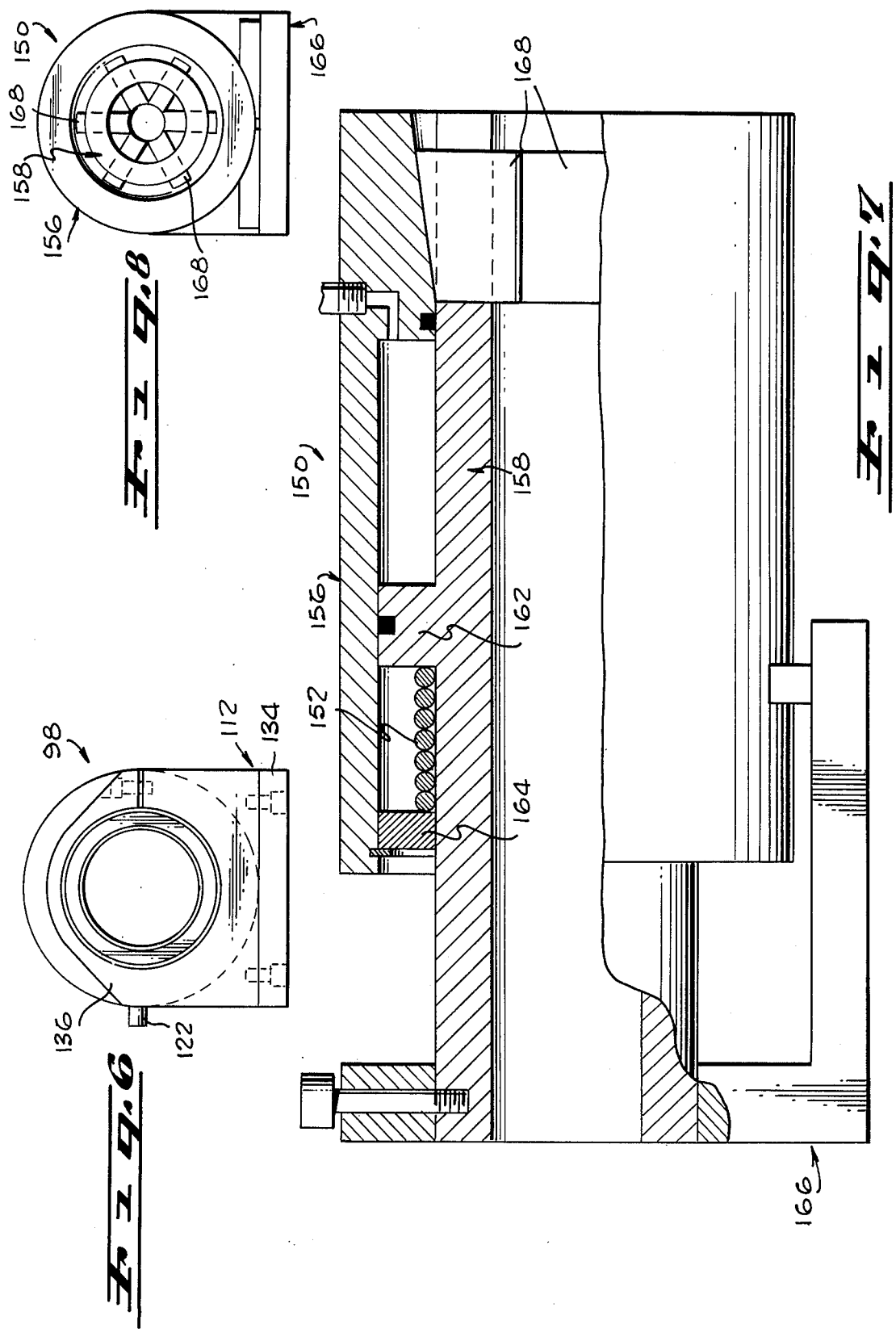

CRIMPING MACHINE

REFERENCE TO CORRESPONDING APPLICATIONS

This is a continuation-in-part of my U.S. patent application Ser. No. 352,174 filed Mar. 1, 1973, now U.S. Pat. No. 3,879,834.

BACKGROUND OF THE INVENTION

This invention relates to crimping apparatus.

Crimping machines can be used to crimp hose fittings onto hoses, to crimp electrical fittings onto cables, or to press elongated pieces of material into a desired shape. Such a machine typically includes serveral crimping dies at a forward end of the machine that can be forced together by a piston of a ram. The ram may include a cylindrical hydraulic cylinder and a solid piston movable in the cylinder and having camming surfaces at a forward piston end that engage the dies to move them together. A workman normally must insert a hose, cable, or other elongated member through the forward end of the machine, since the rearward end is closed by the piston and cylinder. However, in many situations, it is desirable to allow the elongated member to extend through the rear of the machine.

SUMMARY OF THE INVENTION

In accordance with one embodiment of the present invention, a crimping machine is provided which enables free access to the crimping dies through both the front and rear of the machine. The machine includes a ram with a slideable piston for moving a group of crimping dies together, wherein the ram, including the piston thereof, has a central passageway extending along its entire length. The central passgeway is substantially unobstructed rearward of the crimping dies, so that a hose or other elongated member can project through the rear of the machine.

The novel features that are considered characteristic of this invention are set forth with particularity in the appended claims. The invention will be best understood from the following description when read in connection with the accompanying drawings.

BRIEF DESCRIPTION OF THE DRAWINGS

FIG. 1 is a partially sectional perspective view of a crimping machine constructed in accordance with the present invention, showing how it is utilized to crimp a fitting onto a hose;

FIG. 2 is a perspective view of the crimping dies of the machine of FIG. 1;

FIG. 3 is a partially sectional perspective view of a crimping machine constructed in accordance with another embodiment of the invention;

FIG. 6 is a rear elevation view of the machine of FIG. 5;

FIG. 7 is a partial sectional side elevation view of a crimping machine constructed in accordance with yet another embodiment of the invention; and FIG. 8 is a front elevation view of the crimping machine of FIG. 7.

DESCRIPTION OF THE PREFERRED EMBODIMENTS

Figure 4:
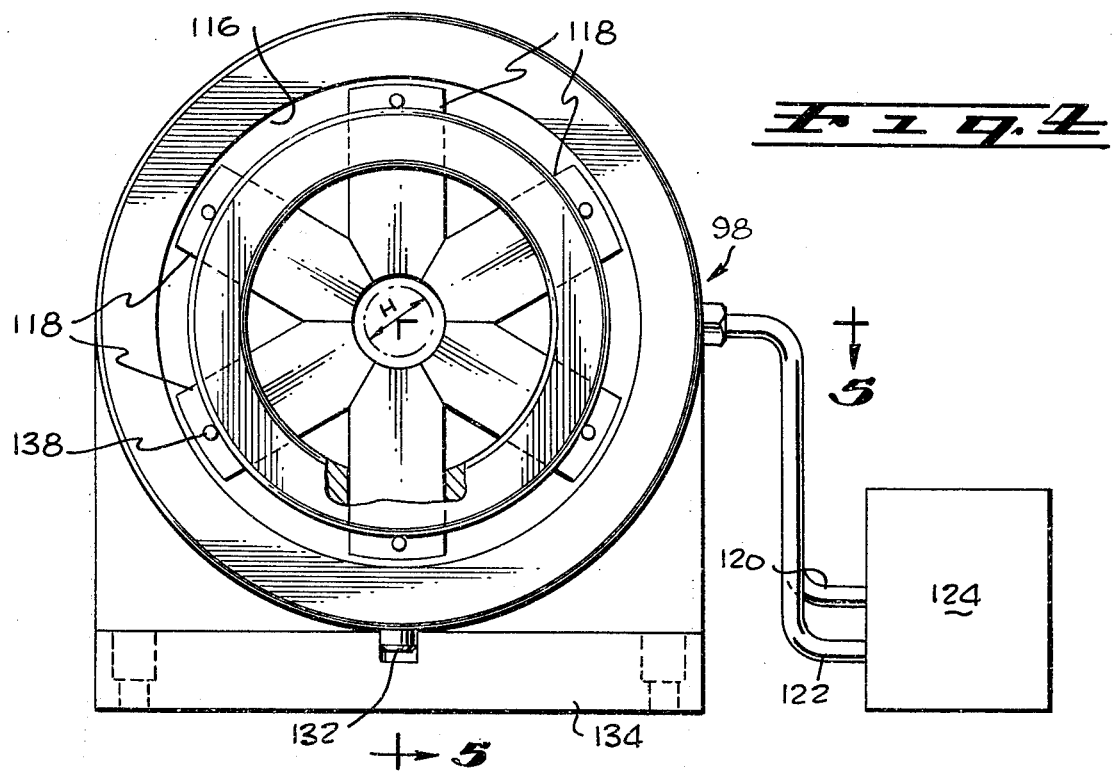
FIG. 4 is a front elevation view of a crimping machine constructed in accordance with still another embodiment of the invention.

FIG. 1 illustrates a crimping machine 10 which is utilized to crimp an end 12 of a hose fitting 14 onto an end 16 of a hose 18. The machine includes a ram 20 with an elongated piston 22 which slides along its length to move a set of crimping dies 24 against the end 12 of the fitting to crimp the fitting onto the hose. The piston 22 has a forward end 26 which is tapered at its inside to form a camming surface 28. The camming surface 28 engages the outside of the crimping dies 24 so that when the piston 22 is moved in a forward direction, as indicated by the arrow F, the dies are moved radially inwardly. A separator 30 which moves the dies apart when the piston is moved rearwardly, is constructed of elastomeric material and includes segments 32 (FIG. 2) located between adjacent crimping dies and tied together by a retainer 34.

The ram 20 is of a hydraulic type, that is, it is operated by a pressurized fluid which may be a liquid such as oil, or a gas such as air. The ram includes a hydraulic "cylinder" or enclosure 36 formed by an inner tubular member 38 and an outer tubular member 40 which is concentric with the inner member. The rearward end 42 of the piston is closely received in the hydraulic cylinder so that when pressurized fluid is applied to the cylinder through a pump and fitting (not shown) the piston is forced in the forward direction to perform a crimping operation. A spring 44 is also provided which returns the piston to its rearward position when hydraulic pressure is removed. The outer tubular member 40 is connected through three rods 46 to a front member 48 which lies at the front of the machine. The front member 48 has a rearwardly extending guide portion 50 which has radially-extending slots or guideways 52 that guide the crimping dies in radial movement against a fitting. The guide portion 50 also prevents axial movement of the crimping dies, the walls of the guideways (or keys therein) projecting into radial slots 53 of the dies to prevent rearward axial movement of the dies. A pair of mounts 54, 56 are designed to support the machine on a table with the piston 22 extending horizontally.

Both the piston 22 and ram 36 have central passageways 58, 60 extending along their entire length. These passageways 58, 60 permit the projection of the hose 18 through most of the length of the machine up to the crimping dies, so that the fitting 14 can be inserted into the front end of the machine and with most of the fitting lying in front of the crimping dies 24. As a result, an angular or gooseneck fitting, such as that shown at 14 in FIG. 1, can be readily accommodated since the angled portion of the fitting lies in front of the machine. This may be contrasted with prior crimping machines which did not have a central passageway extending throughout their length so that the long hose had to extend in front of the machine and the fitting had to lie entirely within the crimping machine, and wherein a gooseneck fitting could not be readily accommodated. The present machine not only allows gooseneck or other fittings with angled or large ends to be accomodated, but also facilitates the crimping operation even in the case of ordinary fittings, because most of the fitting lies outside of the machine where it can be readily held or manipulated by the workmen.

In the case of some gooseneck fittings which are sharply angled, interference may sometimes occur between the front member 48 and the angled portion of the fitting. In order to accommodate such fittings, the front member 48 is provided with a deep groove 62 that extends primarily radially, and at a slight forward angle A away from the radial direction. The groove 62 accommodates the forward end 14F of the angled fitting without unduly weakening the forward member 48. It may be noted that the groove 62 lies along the same position as one of the rods 46 which connects the front member 48 to the outer tubular member 40 of the ram, so that the rod 46 can directly transmit forces to portions of the front member on either side of the groove and little force must be transmitted directly through the grooved portion of the front plate. The angling of the groove 62 at the angle A results in it being able to accomodate the rearward ends of gooseneck fittings of a variety of sizes, the larger sizes projecting a greater distance in front of the dies but extending a greater radial distance out from the center of the machine.

FIG. 3 illustrates another crimping machine 70 which enables further simplification of construction and which accomodates an even greater variety of fitting types. The machine 70 includes a hydraulic ram 72 with a piston 74 that has a front camming surface 76, and a group of crimping dies 78 that are moved together by the piston and which are moved apart by a separator 80. The ram has a hydraulic cylinder of annular shape which includes an outer tubular wall 82 and an inner tubular wall 84 that form an annular space between them through which the annular piston can slide. In accordance with this embodiment of the invention, the inner wall 84 has a forwardly extending portion 86 which forms the guideways 88 through which the crimping dies 78 move.

The provision of the forward extension 86 on the inner wall of the annular hydraulic cylinder results in considerable simplification of construction. Specifically, this eliminates the need for rods or the like to extend forwardly from the outer portion of the ram to the front of the machine and a front member with a rearward extension to form the guideways for the dies. Instead, the inner wall 84 of the cylinder is merely formed longer and formed with radial guideways 88. An important additional advantage of this construction is that the front end 84F of the tubular inner member 84 extends only a short distance in front of the crimping dies 78. It is even possible to have the tubular member extend only as far as the crimping dies if other provisions are made to prevent forward axial movement of the dies as by providing slots similar to slots 53 in the dies of FIG. 2. In any case, the short projection of the front end 84F forward of the crimping dies means that a gooseneck fitting or other fitting with an awkward forward end can be readily accommodated without the need for special grooves or the like. Also, a workman can more easily view the crimping region. It may be noted that the machine 70 of FIG. 3 is also provided with a mount 90 which holds the machine so the passageways in the inner tubular member 84 and piston 74 extend horizontally. Both the machine of FIG. 3, as well as the machine of FIG. 1, preferably extend horizontally to facilitate the insertion of a long length of hose through the machine.

A workman can crimp a fitting onto a hose by projecting the hose through the central aperture of the machine up to the crimping dies, inserting a fitting into the machine so that its end surrounds the hose at the crimping dies, and then operating the ram to move the dies together and crimp the fitting thereon. In most cases, the fitting and hose assembly can be moved either forwardly or rearwardly out of the machine. Where the hose is of a long length and the fitting is not too large, a rearward removal is most convenient, and this is accomplished by pulling the hose so the fitting moves rearwardly through the entire length of the machine and out through the rearward end.

Figure 5:
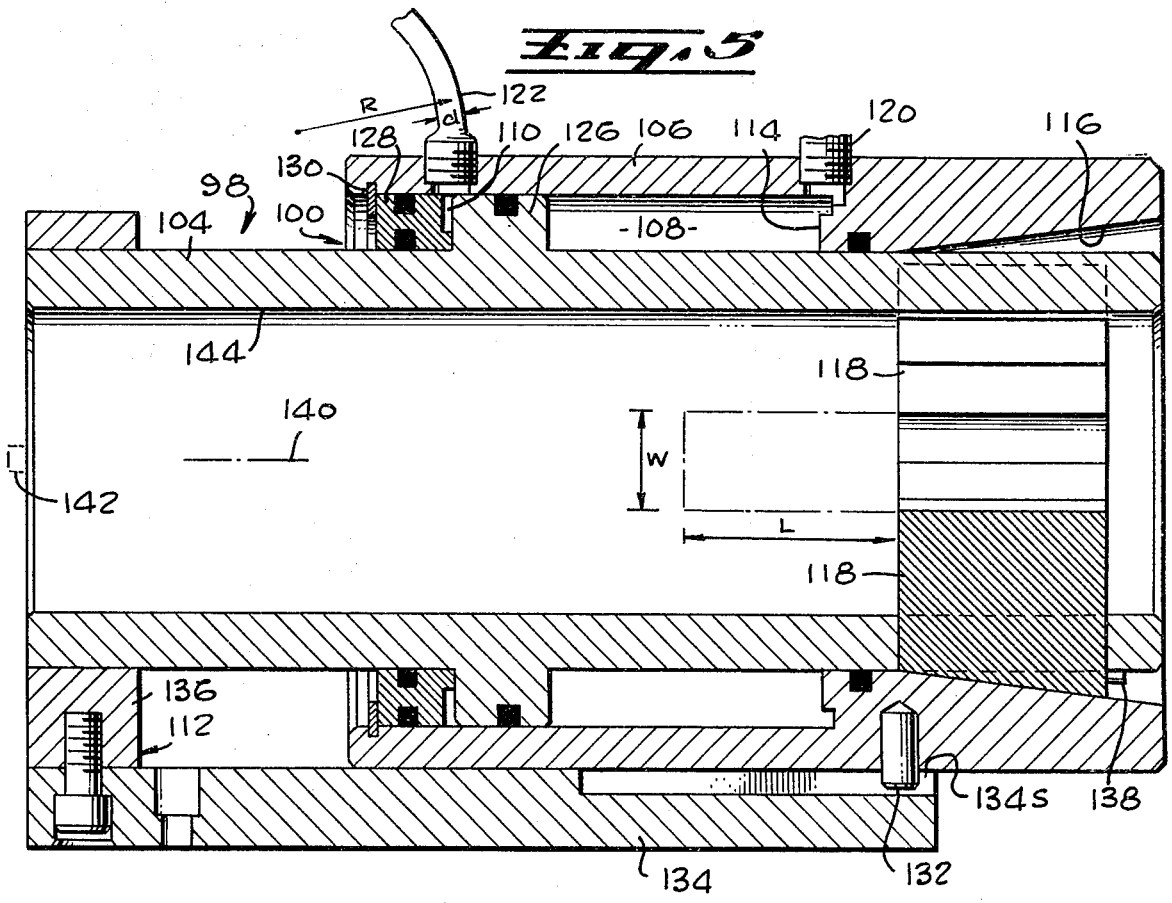
FIG. 5 is a side view, taken on the line 5—5 of FIG. 4.

FIGS. 4-6 illustrate a crimping machine 98 which has a ram 100 that is moved both forwardly and rearwardly by hydraulic power. The ram includes inner and outer cylindrical members 104, 106 that form a pair of annular chambers 108, 110 for receiving hydraulic fluid. The inner member 104 is fixed to a support 112 which can lie on a table, while the outer member 106 moves longitudinally along the inner member. Thus, the inner member 104 serves as a hydraulic cylinder while the outer member 106 serves as a hydraulic piston. The forward end 114 of the outer ram member or piston 106 has a tapered inner camming surface 116 which can engage a set of six dies 118 at the forward end of the machine to move them together, or in other words, to close the dies. When the piston 106 moves rearwardly, the lower dies fall of their own weight, while the upper dies can be easily pressed up.

The ram is energized by hydraulic fluid passing through a pair of flexible hoses 120, 122 which are connected to the piston 106. When the piston must move forward, fluid is passed through hose 120 into chamber 108 while fluid in chamber 110 is emptied through hose 122. The reverse occurs when the piston is to be moved rearwardly. A conventional valve, hydraulic pump, and reservoir assembly 124 is connected to the hoses to control fluid flow.

The cylinder 104 has an outwardly-extending flange 126 at a middle portion thereof which forms a wall of each of the two chambers 108, 110. The piston 106 includes an inward-extending portion at the front 114 which is sealed to the cylinder, and a sealing ring 128 at the rear which is slideable and which is sealed to the cylinder. The ring 128 is formed as a separate member to facilitate assembly of the machine, and is retained against rearward movement by a snap-retainer 130 while being moved rearwardly against the snap-retainer by oil pressure. The piston is prevented from rotating by a roll pin 132 which slides along a groove in a base plate 134 of the support 112. The rear end of the cylinder 104 is captured in a rear end plate 136 of the support 112. When the piston moves to its extreme rearward position, the lower dies 118 can fall until they rest on a surface 134s of the base plate. All of the dies have a retainer pin 138 to prevent the upper dies from falling too far down. In one machine that has been constructed, the inside diameter of the passageway 144 is 4.0 inch.

Both the inner and outer members 104, 106 of the ram, as well as the rest of the machine, is formed to permit an elongated member to project rearwardly through the entire machine. To this purpose, the entire machine apparatus is devoid of obstruction along the horizontal centerline 140 of the dies. It would be possible to locate a bar or other obstruction, such as that indicated in phantom lines at 142, along the centerline 140, while still permitting a flexible hose or cable or project through the rear of the machine up to the dies 118. However, if such an obstruction were present, then it would be necessary for the passageway 144 to be unobstructed along the centerline 140 for a length L and a width W which are both great enough to permit projection of a hose, cable, or other flexible elongated member through the rear of the machine up to the dies 118 without requiring a sharp bend in the elongated member. Typically, a flexible hose or cable may be bent to a radius R, as indicated for one of the hydraulic hoses 122, of about five times the hose diameter d, and still can be slid into the machine; however, it becomes progressively more difficult to slide the hose or cable into or out of a machine, if the hose or cable must be bent at a smaller radius of curvature. Accordingly, the machine is devoid, or clear, of any obstructions immediately behind the dies that would prevent the insertion of an elongated member in a substantially straight configuration, that is, at a configuration where the member is straight or bent at a radius of curvature greater than five times the diameter of the elongated member. Normally, a hose or cable on which a fitting is to be crimped, has a diameter H (FIG. 4) only slightly smaller than the opening in the fully closed dies, so that it would undergo even less bending than a hose of a diameter equal to the opening in the fully closed dies.

FIGS. 7 and 8 illustrate still another crimping machine 150 which utilizes a coil spring 152 for returning a piston or movable outer member 156 rearwardly, and wherein the piston 156 surrounds the stationary inner member 158. The spring 152 is disposed about the inner member 158 rearwardly of a flange 162 thereof, and has a rear spring end coupled to the outer member 156 through a sliding ring 164. The machine is otherwise largely similar to the machine 98 of FIG. 5, with the rear end of the inner member 158 mounted on a support 166, and with the front of the piston having a camming surface which can move a set of dies 168 together.

Thus, the invention provides a crimping machine which facilitates the crimping of a fitting onto a member or the deformation of a member. The device is useful not only to crimp a fitting onto a hose, but also to crimp an electrical fitting onto a cable or other member, or to merely deform a member. The machine facilitates such operations by providing a ram with members that serve as a piston and cylinder and that form a passageway extending through the entire length of the ram, so that a hose or other member can be projected or can project through the entire length of the machine or through the rear of the machine to the dies.

Although particular embodiments of the invention have been described and illustrated herein, it is recognized that modifications and variations may readily occur to those skilled in the art and consequently it is intended that the claims be interpreted to cover such modifications and equivalents.

I claim:
1. A crimping machine comprising:
an inner cylinder member having forward and rearward ends and having a central passageway;
die means movably mounted at the front portion of said inner member to close and open;
an outer piston member disposed about said inner member and movable forwardly and rearwardly with respect to said inner member, said outer member having a forward portion coupled to said die means to force said die means toward a closed configuration when said outer member moves in a forward direction;
said inner member having an outwardly-extending flange sealed to the inside of said outer member, and said outer member having an inwardly-extending forward portion sealed to the outside of said inner member forward of said flange, to form a forward hydraulic chamber;
a ring disposed around said inner member rearwardly of said flange, said ring sealed to the outer surface of said inner member and the inner surface of said outer member, to form a rearward hydraulic chamber;
means for coupling ring to said outer member to allow said ring to apply rearward force to said outer member; and
means for coupling hydraulic fluid to said forward hydraulic chamber to pressurize said hydraulic chamber and move said outer member forwardly, and for coupling hydraulic fluid to said rearward hydraulic chamber to pressure said rearward hydraulic chamber and move said ring and outer member rearwardly.

2. A crimping machine comprising:
an inner cylinder member having forward and rearward ends and having a central passageway;
die means movably mounted at the front portion of said inner member to close and open;
an outer piston member disposed about said inner member and movable forwardly and rearwardly with respect to said inner member, said outer member having a forward portion coupled to said die means to force said die means toward a closed configuration when said outer member moves in a forward direction;
said inner member having an outwardly-extending flange sealed to the inside of said outer member, and said outer member having an inwardly-extending forward portion sealed to the outside of said inner member forward of said flange, to form a hydraulic chamber;
means for coupling hydraulic fluid to said hydraulic chamber to pressurize said hydraulic chamber and move said outer member forwardly; and
a coil spring disposed about said inner member behind said flange thereof, said spring having a rearward end coupled to said outer member to urge it rearwardly.

* * * * *